(12) United States Patent
Berger et al.

(10) Patent No.: US 8,869,503 B2
(45) Date of Patent: Oct. 28, 2014

(54) DRIVE TRAIN, IN PARTICULAR FOR A MOTOR VEHICLE

(75) Inventors: Jurgen Berger, Gerstetten (DE); Stephan Bartosch, Rammingen (DE)

(73) Assignee: SteamDrive GmbH, Heidenheim (DE)

( * ) Notice: Subject to any disclaimer, the term of this patent is extended or adjusted under 35 U.S.C. 154(b) by 235 days.

(21) Appl. No.: 13/510,282

(22) PCT Filed: Jun. 23, 2010

(86) PCT No.: PCT/EP2010/003833
§ 371 (c)(1),
(2), (4) Date: Jul. 20, 2012

(87) PCT Pub. No.: WO2011/066872
PCT Pub. Date: Jun. 9, 2011

(65) Prior Publication Data
US 2012/0279204 A1 Nov. 8, 2012

(30) Foreign Application Priority Data
Dec. 4, 2009 (DE) .......................... 10 2009 056 822

(51) Int. Cl.
| | |
|---|---|
| *F02C 6/00* | (2006.01) |
| *F01K 13/00* | (2006.01) |
| *F02G 5/02* | (2006.01) |
| *F01N 5/02* | (2006.01) |
| *F02M 25/07* | (2006.01) |
| *F01K 23/06* | (2006.01) |

(52) U.S. Cl.
CPC .............. *F01K 23/065* (2013.01); *F02G 5/02* (2013.01); *F01N 5/02* (2013.01); *Y02T 10/16* (2013.01); *F02M 25/0728* (2013.01); *Y02T 10/166* (2013.01); *Y02T 10/121* (2013.01); *F02M 25/0732* (2013.01)
USPC .......................................... 60/39.182; 60/676

(58) Field of Classification Search
USPC ...................................... 60/39.182, 670, 676
See application file for complete search history.

(56) References Cited

U.S. PATENT DOCUMENTS

| | | | | |
|---|---|---|---|---|
| 4,069,674 | A | * | 1/1978 | Warren ......................... 60/641.8 |
| 5,347,814 | A | * | 9/1994 | Kemmer et al. ................ 60/676 |

(Continued)

FOREIGN PATENT DOCUMENTS

| | | |
|---|---|---|
| DE | 31 48 208 | 6/1983 |
| DE | 10 2006 036 122 | 2/2007 |

(Continued)

OTHER PUBLICATIONS

English Translation of International Preliminary Report on Patentability dated Jan. 31, 2013.

(Continued)

*Primary Examiner* — Hoang Nguyen
(74) *Attorney, Agent, or Firm* — Farjami & Farjami LLP

(57) ABSTRACT

A drive train for a motor vehicle is provided. The drive train includes a heat flow generating drive motor, a steam engine in a steam circuit, and an evaporator. The evaporator has an inlet for liquid working fluid and an outlet for evaporated working fluid. The evaporator also includes an auxiliary outlet, via which a portion of the heated working fluid is guided through the inlet into the first evaporator and is discharged with the heat flow, before the residual working fluid in the evaporator is further evaporated by means of the heat flow.

13 Claims, 1 Drawing Sheet

(56) References Cited

U.S. PATENT DOCUMENTS

| | | | |
|---|---|---|---|
| 5,609,029 A | | 3/1997 | Ahnger |
| 5,622,605 A | * | 4/1997 | Simpson et al. ............... 203/10 |
| 5,850,740 A | * | 12/1998 | Sato et al. ..................... 60/676 |

FOREIGN PATENT DOCUMENTS

| | | |
|---|---|---|
| DE | 10 2007 052 117 | 5/2009 |
| EP | 1 249 580 | 10/2002 |
| EP | 1 840 365 | 10/2007 |
| EP | 2 110 634 | 10/2009 |
| WO | WO 2004/033859 | 4/2004 |
| WO | WO 2008/125827 | 10/2008 |

OTHER PUBLICATIONS

English Translation of International Preliminary Report on Patentability dated Mar. 21, 2013.

* cited by examiner

DRIVE TRAIN, IN PARTICULAR FOR A MOTOR VEHICLE

This is a U.S. national phase application, which is based on, and claims priority from, PCT application Serial No. PCT/EP2010/003833, filed Jun. 23, 2010, which claims priority from foreign application Serial No. 10 2009 056 822.0, filed Dec. 4, 2009, in Germany.

BACKGROUND

The present invention concerns a drive train, in particular for a motor vehicle, in which the heat flow generated by a drive motor is used for evaporating a working fluid and the evaporated working fluid is expanded in a steam engine, to generate an additional drive power.

Drive units of the type above mentioned have been known to the man of the art for many decades, and have been hardly further developed in the meantime. Due to today's harsher requirements in terms of optimal energy consumption of vehicles driven by internal combustion engine, in particular rail vehicles or lorries, such drive units have recently aroused the interest of the trade. In this context, different embodiments have been suggested, in which the waste heat is used at different positions of the drive train for steam generation, for instance in the exhaust gas stream, in the so-called exhaust gas recirculation of an internal combustion engine or in the cooling circuit. We refer here for instance to the international patent application WO 2004/033859 A1.

Although basic approaches are available for maximum waste heat recycling, there is a continuous need for further improvements so as to optimise waste heat recycling, hereby to lower the fuel consumption and/or to increase the power of the drive motor, however to simultaneously meet the stringent requirements in terms of future exhaust gas emissions.

Disclosure DE 31 48 208 A1 describes a drive device composed of internal combustion engine and steam engine, in which the steam engine is operated by a separate water/steam circuit, which is coupled to the cooling water system of the internal combustion engine via a first heat exchanger and which is guided via a heat exchanger acting as an evaporator, through which the exhaust gas of the internal combustion engine is guided. The steam generation in the exhaust gas can be adjusted by means of a controlled pump by means of which the amount of water injected into the exhaust gas heat exchanger can be dosed.

EP 1 249 580 A1 describes a heat recovery system for an internal combustion engine having a plurality of evaporators, which work at different temperature levels.

SUMMARY

U.S. Pat. No. 5,609,029 A describes a method for improving the energy consumption of a liquid-cooled thermal machine, whereas at least a portion of the coolant is guided into an evaporation chamber and is evaporated there.

The object of the present invention is to offer a drive train, in particular of a motor vehicle, such as a rail vehicle or a truck, which is enhanced as regards said requirements with respect to the state of the art.

The object of the invention is satisfied with a drive train with the features of the independent claims. Advantageous and particularly appropriate embodiments of the invention are disclosed in the dependent claims.

The drive train according to the invention, which can be used in particular as a motor vehicle drive train, for instance of a track vehicle or truck however also in other drive trains, such as in a individual vehicle, on board a ship or in stationary installations, comprises a heat flow generating drive motor. If the drive motor is designed as an internal combustion engine, the heat flow can for instance be contained in the exhaust gas. Other heat flows can also be used however, for instance in a cooling circuit for the drive motor, regardless of whether it is designed as an internal combustion engine or as another engine, for instance an electrical motor or a fuel cell.

According to the invention, a steam engine is provided in a steam circuit, whereas a working fluid is evaporated in the steam circuit and is then expanded in the steam engine. Generally, a storage tank or a compensating container as well as a condenser are also provided in the steam circuit for the working medium.

The steam circuit according to the invention includes at least one evaporator, in this instance designated as the first evaporator, advantageously a plurality of evaporators, which are subjected by at least one portion of the heat flow of the drive motor, so as to evaporate the working fluid. A fraction of the evaporation also encompasses in particular cases heating the working fluid for later phase transition in an additional evaporator.

According to a first embodiment of the invention, the evaporator (the first evaporator) comprises an inlet for liquid working fluid and an outlet for evaporated working fluid. By evaporated working fluid is meant in said context partially evaporated, completely evaporated as well as overheated working fluid, according to the configuration of the invention.

The (first) evaporator includes according to this form of embodiment moreover an auxiliary outlet, via which a portion of the heated working fluid is guided through the inlet into the first evaporator and is discharged with the heat flow, before the residual working fluid in the evaporator is further evaporated by means of the heat flow. Here also, the further evaporation need not include a phase transition of the working fluid, but it can.

Particularly advantageously, the working fluid discharged via the auxiliary outlet out of the evaporator is in liquid state, whereas conversely the working fluid is in the next step further evaporated in the evaporator and then discharged via the outlet in particular in a completely evaporated state or even overheated.

According to an advantageous embodiment, a second evaporator is provided In addition to the described (first) evaporator, in which the working fluid discharged via the auxiliary outlet is evaporated by means of a second heat flow. The second heat flow can hence also be generated via the drive motor and for instance transported in the exhaust gas or cooling circuit thereof. If the drive motor is designed as an internal combustion engine, which generates an exhaust gas stream leading to at least one portion of the heat flow, from which a portion is returned via an exhaust gas recirculation to the fresh air side of the internal combustion engine, the first evaporator can for instance be arranged in the exhaust gas recirculation and there be subjected to the heat flow of the exhaust gas in the exhaust gas recirculation, and that the second evaporator can advantageous be arranged in the exhaust gas stream outside the exhaust gas recirculation, in particular in the flow direction behind a branch leading to the exhaust gas recirculation.

This configuration enables on the one hand to obtain particularly effective evaporation of the working fluid and on the other hand extensive cooling down of the exhaust gas of the exhaust gas recirculation. A particularly large working fluid in liquid state, in which the working fluid includes a comparatively small specific volume, is consequently guided into the evaporator and there subjected to the heat coming out of the exhaust gas stream. Before now the specific volume of the working fluid considerably increases during evaporation, a portion of the working fluid is again discharged from the evaporator via the auxiliary outlet. This means that in the area of the evaporator, in which the partial or complete phase transition of the working fluid takes place, the flow cross-sections for the working medium should not be larger in design compared with conventional evaporators, although more liquid working fluid than so far is introduced into the evaporator.

According to an alternative embodiment of the invention, in which the first evaporator is placed in the exhaust gas recirculation of the drive motor designed as an internal combustion engine, a second evaporator is arranged behind the first evaporator in the exhaust gas recirculation for evaporating the working fluid. The second evaporator is consequently run through by a portion of the working fluid flowing through the first evaporator and there subjected to a heat flow. The residual portion conversely is diverted past the second evaporator in a bypass and is mixed again behind the second evaporator with the portion guided through the second evaporator. Behind the evaporator can mean here immediately behind the evaporator as well as in the flow direction further down in the working fluid circuit, behind additional interposed units. It is also possible to convey the portion of the working fluid flow through the bypass similarly to a condenser in the working fluid circuit or to a storage tank. There can be additional feedback points into the steam circuit.

Particularly advantageously, the bypass leading to the second evaporator comprises a further (third) evaporator, which in particular is also subjected to a heat flow coming out of the exhaust gas stream for evaporating the working fluid. The additional evaporator is then arranged however advantageously outside the exhaust gas recirculation, for instance in the exhaust gas stream in the flow direction of exhaust gas behind a branch for exhaust gas recirculation.

In both embodiments according to the invention, the exhaust gas can be cooled far more extensively in the exhaust gas recirculation through the comparatively greater mass flow of the working fluid before being discharged from the exhaust gas recirculation. This is a basic requisite for respecting future exhaust gas requirements. Conversely, the amount of heat in the exhaust gas recirculation should not always be sufficient to evaporate and possibly to overheat the mass flow of the working fluid brought first of all in heat transferring contact with the exhaust gas recirculation. Consequently, the invention enables on the one hand to meet future exhaust gas requirements reliably and to perfectly recycle simultaneously present amounts of heat.

The volume flows and/or the pressure of the working fluid can advantageously be controlled or regulated at one or several places in the steam circuit, in particular by means of valves positioned there or various setting devices. It thus enables for instance to regulate or to control the working fluid flow discharged from the auxiliary outlet or the volume of the working fluid flow introduced into the bypass. It is further possible to control or to regulate the working fluid flow into the first evaporator by means of a pressure regulating valve or volume regulating valve. Also the volume and/or the pressure of working fluid flow which is not guided into the bypass or the working fluid flow discharged via the outlet for evaporated working fluid, can be varied by a corresponding valve or another control member.

Alongside the evaporators described here, additional heat transmitters can also be provided in which heat is transmitted into the working fluid or is extracted from the working fluid.

A heat transmitter can be used for instance in the first case as a charge air cooling system, to heat the working fluid.

BRIEF DESCRIPTION OF THE DRAWINGS

The invention will now be described using two exemplary embodiments.

The figures are as follows.

DETAILED DESCRIPTION

Figure 1:
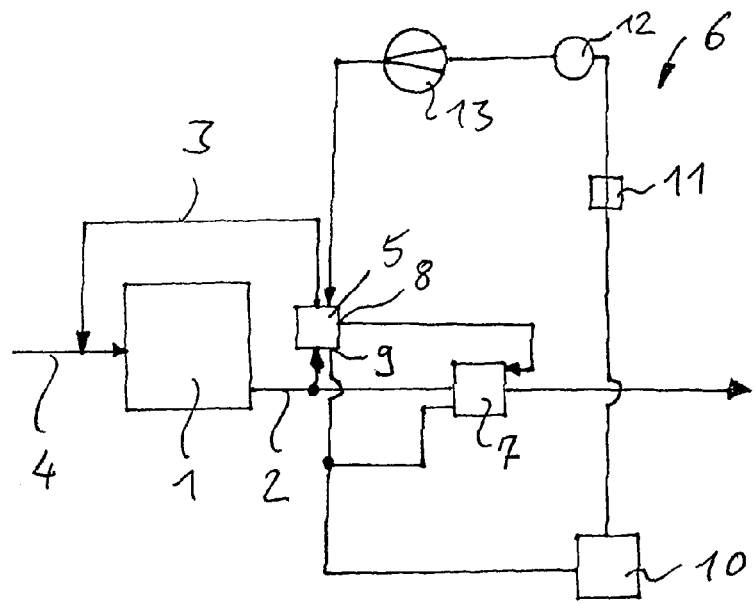
FIG. 1 shows a first exemplary embodiment of drive train designed according to the invention.

FIG. 1 represents schematically a drive train with a drive motor 1, which generates an exhaust gas stream 2. The exhaust gas stream 2 naturally guides a heat flow of the drive motor 1, as it is usual with drive motors designed as internal combustion engines.

A portion of the exhaust gas flow 2 is guided via an exhaust gas recirculation 3 to the fresh air side 4 of the drive motor 1. As known by the man of the art, the purpose is to reduce emissions in the exhaust gas stream 2 of the drive motor 1.

A first evaporator 5 of a steam circuit 6 is arranged in the exhaust gas recirculation 3. The working fluid of the steam circuit 6 is at least partially evaporated in said first heat exchanger 5, whereas by partial evaporation is meant here also or in particular only heating without phase transition of the liquid working fluid.

Only a portion of the working fluid of the steam circuit 6 flowing into the first evaporator 5 is branched off from the evaporator 5 via an auxiliary outlet 8 and conveyed to a second evaporator 7, which is positioned in the exhaust gas stream 2 behind the branch with the diversion of the exhaust gas into the exhaust gas recirculations 3. The working fluid, which is not branched off via the auxiliary outlet 8 in the first evaporator, is further evaporated in the first evaporator and leaves the first evaporator 5 via the outlet 9 for the evaporated working fluid, in particular in partially or completely evaporated state.

The working fluid flowing out of the outlet 9 is again mixed with the working fluid flowing out of the second evaporator 7 and together conveyed to the steam engine 10. If desirable, additional heat can be conveyed beforehand to the working fluid in one or several further evaporators.

the conveyed working fluid does its work in the steam engine 10 under expansion which can be used for driving the drive train, in particular the motor vehicle in the case of a motor vehicle drive train, to complement the drive power of the drive motor 1, or which can be used for driving a further unit, for instance an electric generator.

The working fluid coming out of the steam engine is condensed in the condenser 11 and returned to a collecting tank 12. The feed pump 13 pumps the liquid working fluid out of said collecting tank 12 again in the direction of the first evaporator 5. In deviation from the form of embodiment illustrated here, the collecting tank 12 could however be provided on another position or be dispensed with under precise constraints.

Figure 2:
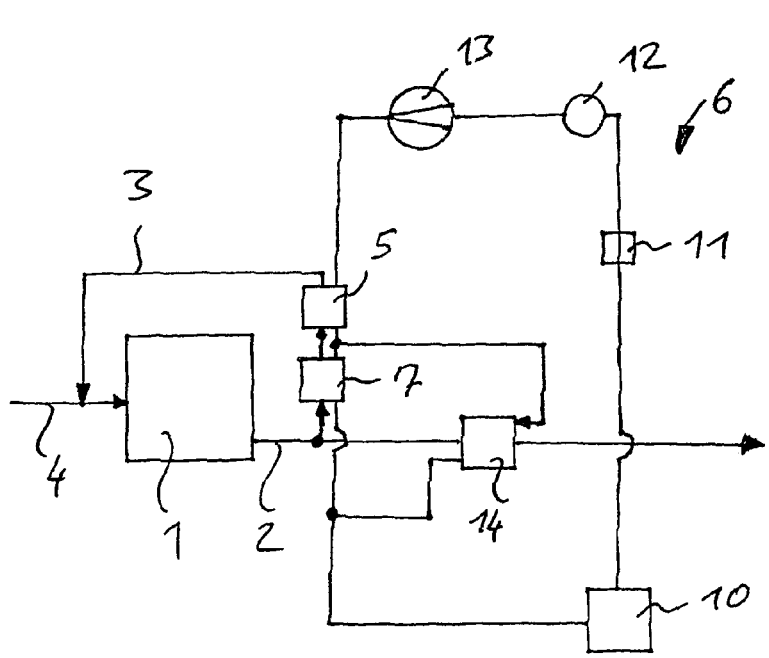
FIG. 2 shows a second exemplary embodiment of drive train designed according to the invention.

The embodiment according to FIG. 2 differentiates from that of FIG. 1 in that here two evaporators are positioned in the flow direction of exhaust gas and in the flow direction of the working fluid behind one another in the exhaust gas recirculation 3. In that case, a portion of the working fluid flowing out of the first evaporator 5 is branched off and guided through a by-pass around the second evaporator 7. Consequently, it is not the whole working fluid, which is guided into the first evaporator 5 in the exhaust gas recirculation 3, which is evaporated in the second evaporator 7 in the exhaust gas recirculation 3, but rather a portion is conveyed to a third evaporator 14, which is arranged in the exhaust gas stream 2 behind the branch leading to the exhaust gas recirculation 3, and then subjected to heat coming out of the exhaust gas stream 2. Subsequently, the working fluid out of the third evaporator 14 is mixed with the working fluid exiting from the second evaporator 7, and then conveyed to the steam engine 10.

In the embodiment according to FIG. 2, two evaporators 5, 7 are thus used in the exhaust gas recirculation 3 and any auxiliary outlet on an evaporator can be dispensed with. It would of course be also possible to equip the first evaporator 5 or the second evaporator 7 according to the representation of FIG. 1 with an auxiliary outlet, so as to combine the embodiments according to FIG. 1 and according to FIG. 2.

The invention illustrated here can be used regardless of whether the drive motor is charged by means of a one- or multistage turbo charger or whether a turbo compound system. Far more, the present invention can be used in addition to these aforementioned measures or as alternatives thereto.

The invention claimed is:

1. A drive train for a motor vehicle, the drive train comprising:
 a heat flow generating drive motor;
 a steam engine in a steam circuit, in which a working fluid is evaporated and expanded in the steam engine;
 a first evaporator arranged in the steam circuit and operated with at least one portion of the heat flow, so as to evaporate the working fluid, wherein the first evaporator comprises an inlet for liquid working fluid and an outlet for evaporated working fluid, and wherein the first evaporator comprises an auxiliary outlet, via which a portion of the heated working fluid is guided through the inlet into the first evaporator and is discharged with the heat flow, before the residual working fluid in the evaporator is further evaporated by means of the heat flow; and
 a second evaporator arranged in an exhaust gas stream outside an exhaust gas recirculation in a flow direction behind a branch leading to the exhaust gas recirculation, wherein the working fluid discharged via the auxiliary outlet is evaporated in the second evaporator using a second heat flow.

2. The drive train according to claim 1, wherein the working fluid discharged via the auxiliary outlet is in a liquid state and the working fluid discharged via the outlet is in a fully evaporated state.

3. The drive train according to claim 2, wherein a second evaporator is arranged, in which the working fluid discharged via the auxiliary outlet is evaporated by means of a second heat flow.

4. The drive train according to claim 1, wherein the heat flow generating drive motor is designed as an internal combustion engine that generates an exhaust gas stream guiding at least one portion of the heat flow, from which a portion is returned via an exhaust gas recirculation to a fresh air side of the internal combustion engine, and the first evaporator is arranged in an exhaust gas recirculation while being subjected to the heat flow of the exhaust gas in the exhaust gas recirculation.

5. The drive train according to claim 2, wherein the heat flow generating drive motor is designed as an internal combustion engine that generates an exhaust gas stream guiding at least one portion of the heat flow, from which a portion is returned via an exhaust gas recirculation to a fresh air side of the internal combustion engine, and the first evaporator is arranged in an exhaust gas recirculation while being subjected to the heat flow of the exhaust gas in the exhaust gas recirculation.

6. The drive train according to claim 1, wherein the heat flow generating drive motor is designed as an internal combustion engine that generates an exhaust gas stream guiding at least one portion of the heat flow, from which a portion is returned via an exhaust gas recirculation to a fresh air side of the internal combustion engine, and the first evaporator is arranged in an exhaust gas recirculation while being subjected to the heat flow of the exhaust gas in the exhaust gas recirculation.

7. The drive train according to claim 3, wherein the heat flow generating drive motor is designed as an internal combustion engine that generates an exhaust gas stream guiding at least one portion of the heat flow, from which a portion is returned via an exhaust gas recirculation to a fresh air side of the internal combustion engine, and the first evaporator is arranged in an exhaust gas recirculation while being subjected to the heat flow of the exhaust gas in the exhaust gas recirculation.

8. The drive train according to claim 1, wherein at least one of a volume flow regulating valve and a pressure regulating valve is in the steam circuit in the flow direction of the working fluid upstream of the first evaporator in the exhaust gas recirculation, by means of which the volume flow rate of the working fluid into at least one of the first evaporator and the pressure of the working fluid at the inlet of the first evaporator can be controlled or regulated.

9. A drive train for a motor vehicle, the drive train comprising:
 a heat flow generating drive motor;
 a steam engine in a steam circuit, in which a working fluid is evaporated and expanded in the steam engine;
 wherein the heat flow generating drive motor is designed as an internal combustion engine that generates an exhaust gas stream guiding at least one portion of heat flow, from which a portion is returned via an exhaust gas recirculation to a fresh air side of the internal combustion engine; and
 a first evaporator is arranged in the exhaust gas recirculation while being subjected to the heat flow;
 wherein a second evaporator is arranged in the exhaust gas recirculation downstream of the first evaporator in the exhaust gas recirculation and in an exhaust gas stream outside the exhaust gas recirculation in a flow direction behind a branch leading to the exhaust gas recirculation, operated only with a portion of the working fluid guided through the first evaporator in the exhaust gas recirculation and a residual portion of the working medium is diverted past the second evaporator in a bypass and is mixed again behind the second evaporator with the portion guided through the second evaporator.

10. The drive train according to claim 9, wherein an additional evaporator is placed in the bypass that is also subjected to a heat flow coming out of the exhaust gas stream for evaporating the working fluid, whereas the additional evaporator is arranged outside the exhaust gas recirculation.

11. The drive train according to claim 9, wherein at least one of a volume flow regulating valve and a pressure regulating valve is in the steam circuit in the flow direction of the working fluid upstream of the first evaporator in the exhaust gas recirculation, by means of which the volume flow rate of the working fluid into at least one of the first evaporator and the pressure of the working fluid at the inlet of the first evaporator can be controlled or regulated.

12. The drive train according to claim 10, wherein at least one of a volume flow regulating valve and a pressure regulating valve is in the steam circuit in the flow direction of the working fluid upstream of the first evaporator in the exhaust gas recirculation, by means of which the volume flow rate of the working fluid into at least one of the first evaporator and the pressure of the working fluid at the inlet of the first evaporator can be controlled or regulated.

13. The drive train according to claim 9, wherein the volume flow rate of the working fluid, guided via an auxiliary outlet or into the bypass, can be altered by means of at least one of a valve and the volume flow rate of the working fluid, guided via the outlet or in the direction of the second evaporator can be altered by means of a valve.

* * * * *